Dec. 27, 1938.  R. HEINZ  2,141,298
VEHICLE DOOR CONSTRUCTION
Filed March 16, 1937  2 Sheets-Sheet 1

Inventor
Rust Heinz.

Attorney.

Dec. 27, 1938.  R. HEINZ  2,141,298
VEHICLE DOOR CONSTRUCTION
Filed March 16, 1937  2 Sheets—Sheet 2
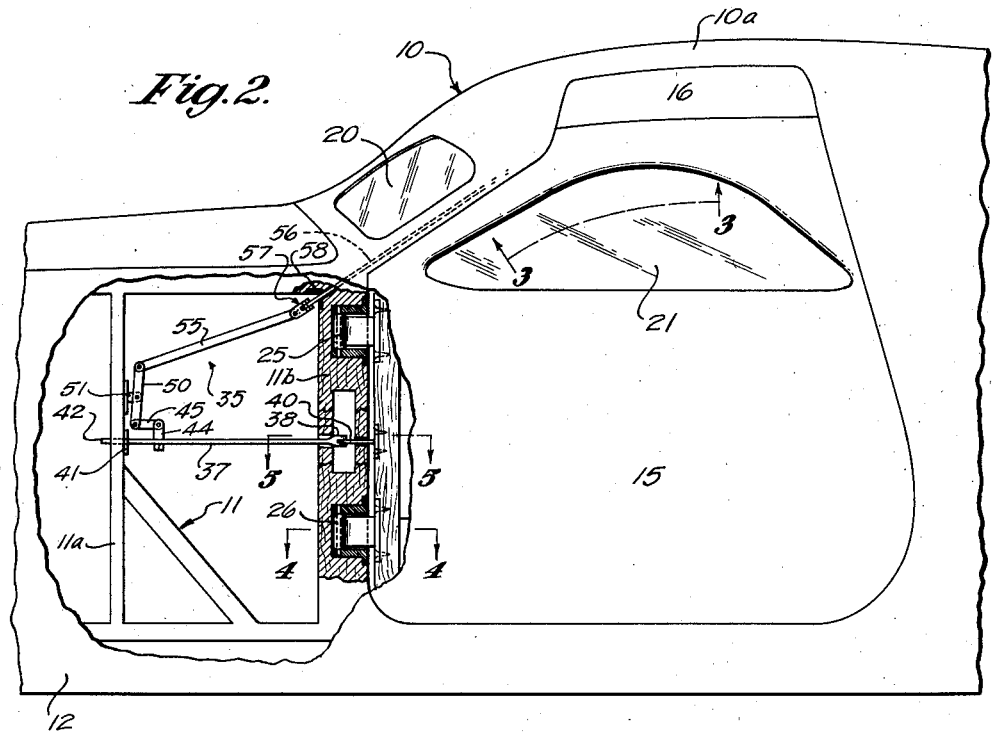
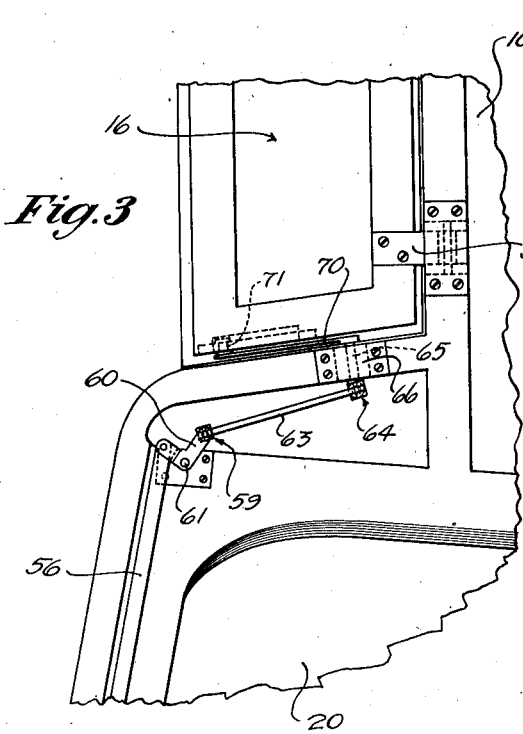
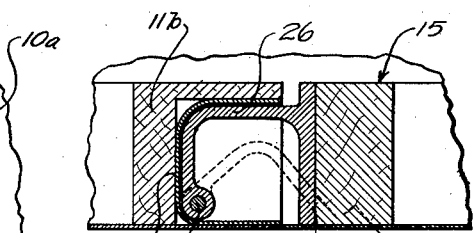
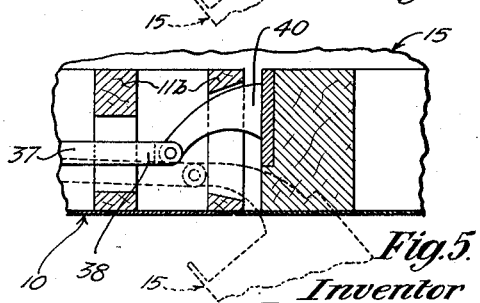
Inventor
Rust Heinz.
Attorney.

Patented Dec. 27, 1938

2,141,298

UNITED STATES PATENT OFFICE 2,141,298

VEHICLE DOOR CONSTRUCTION

Rust Heinz, Pasadena, Calif.

Application March 16, 1937, Serial No. 131,192

4 Claims. (Cl. 296—44)

My invention relates to improvements in vehicle door construction and, in its more particular aspects, has to do with means for providing increased headroom over the doorways of closed vehicle bodies.

In vehicles such, for instance, as automobiles, the modern trend is towards those of the low slung type wherein the center of gravity is placed as low as possible. This requires that the roof of the vehicle body be commensurately lower and considerable difficulty has been experienced in affording ample head room for passengers entering and leaving such vehicles. While the prior art includes some devices aimed at meeting this need, those devices have, so far as I am aware, been of such design and construction as to render them impractical for general or satisfactory use.

Among the objects of my invention, I aim to provide means for temporarily increasing the headroom over vehicle doors when the doors are in open position; and means for automatically operating said auxiliary opening by virtue of and in unison with operation of the regular vehicle door.

Another object is to provide a linkage system between the main vehicle door and the auxiliary or roof door of such character and mounting in the vehicle body that it is not exposed to atmospheric conditions and is at all times completely out of interference with the doorway.

A further object is to provide a linkage system so mounted on the body frame and so associated with the main vehicle door as to afford increased leverage for easy operation.

Another object is to provide a novel type of concealed hinge for the main vehicle door.

Other objects and corresponding accomplishments of the invention will appear from the detailed description of a preferred embodiment thereof which will be given hereinafter.

Preferably, I accomplish these objects by providing in the roof of the closed vehicle body, immediately over the side door, for instance, an auxiliary or roof-door which is hingedly connected to the roof and connected by concealed links to the hinged side of the regular side door so as to be automatically swung open and closed in unison with and by virtue of opening and closing of the side door.

So that my invention may be better understood, I shall now, by way of example, describe in detail one preferred embodiment thereof, but in doing so I wish it understood that my invention, in its broader aspects, is not confined to the details of construction and design and to the particular combination and association of parts used in the following description and illustrated in the accompanying drawings. Rather, my invention is limited only as shown by the appended claims.

For purposes of this description, I shall refer to the attached drawings, in which:

Fig. 2 is a side view, with parts broken away, of a part of a closed vehicle body;

Fig. 3 is a section on line 3—3 of Fig. 2;

Fig. 4 is a section on line 4—4 of Fig. 2; and

Fig. 5 is a section on line 5—5 of Fig. 2.

Figure 1:
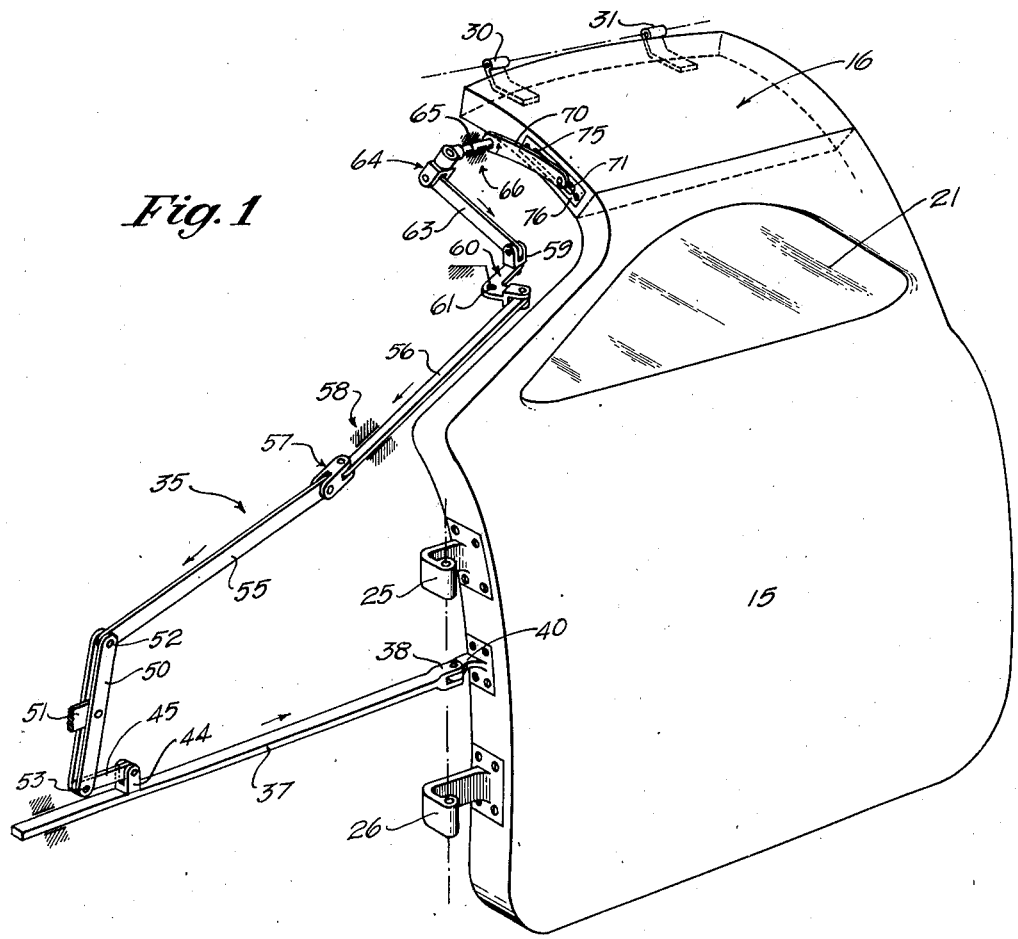
Fig. 1 is a perspective of a vehicle door showing my improved construction, including a diagrammatic showing of the linkage connecting the main and auxiliary doors.

In the drawings, the closed vehicle body 10 has a framework 11 covered by metal or wood 12, a side door 15 and a hinged roof portion 16 immediately over the door 15. 20 indicates the windshield and 21 the side door window.

Door 15 is hinged to the body frame by hinge members 25, 26, the hinge connections being at the side of the door so that the door swings in a horizontal plane. The hinged roof portion 16, which may be termed a trap door, is hingedly connected to the roof 10a by hinge members 30, 31.

The trap door 16 is opened and closed automatically and in unison with the side door 15 by means of the linkage generally designated by the numeral 35 (Figs. 1 and 2). This linkage is housed within the body frame and is removed from the doorway so that it presents no obstruction to ingress and egress of passengers through the doorway. It consists of bar 37 bifurcated at one end 38 and pivotally connected at that end to bracket 40 secured to the side face of door 15. Bar 37 is slidable longitudinally in a body guideway 41 provided in vertical frame member 11a, and, adjacent its free end 42, it has affixed to its top a bifurcated member 44 to which is pivotally connected another link 45. Link 45 is pivotally connected at its other end to lever 50, which latter member typically consists of two parallel bars pivoted at their center to a fulcrum lug 51 secured to frame member 11a, those bars being spaced apart by lug 51, link 45 and a link 55, and held together by pins 52, 53. Link 55 is pivotally connected at one end to the top of lever 50 and at its other end it is connected to another link 56 by means of universal joint 57. Link 56 is slidably mounted in a body frame guide-way 58 and is connected pivotally at its other end to one arm of a bell crank 60, which latter member is mounted on the body frame 11 by means of pin 61 journalled in the body frame. The other arm of bell crank 60 carries universal joint 59 which has pivotally connected thereto one end of a link 63, the other end of which link is pivotally connected to the bifurcated arm of universal member 64 secured to shaft 65, the said shaft being journalled in the body frame as shown at 66. To the other end of shaft 65 is secured an arm 70 which has a roller 71 at its outer end. Roller 71 moves longitudinally of slot 75 provided in plate 76 mounted in the side face of trap door 16.

The side-door hinge members 25, 26 are substantially identical. As will be best seen in Fig. 4, L-shaped hinge member 26, when the door is closed, fits within the cup-shaped member 27 to which it is pivoted at 28, member 27 being mounted in a recess provided in the vertical body frame member 11b which extends along one side of the doorway. The dotted lines in Fig. 4 illustrate the position of the hinge member when the door is opened. Thus it will be observed that the hinge elements are housed so as to be concealed from view and so as not to be exposed to the elements.

While I have described my invention as being applied only to one side door of a closed vehicle, it will of course be understood that a duplicate mechanism may be employed for the other side or as many entrances as the vehicle may have.

The various views (except for the dotted line illustrations) show the position of the parts when the vehicle doors—that is, both the main side door and the roof door—are closed. To open the roof door, the side door is opened, which automatically moves the link members in the directions indicated by the arrows (Fig. 1) and swings roof door 16 upwardly about its hinges 30, 31. Closure of the main side door 15 then automatically returns the parts to the positions indicated in the drawings.

I claim:

1. In a closed vehicle body, a doorway including as the upper part thereof a roof opening, means for opening and closing said doorway including a lower door and an upper door, frame members in the body, hinge members connecting one edge of the lower door to one side of the doorway and hinge members connecting the top of the upper door to the top of the doorway, and means for automatically operating the upper door in unison with and by virtue of operation of the lower door, including: a slot in one side of the top door, an arm cooperating with said slot to open and close said door, and links operatively connected at one end to said arm and pivotally connected at the other end to the hinged edge of the lower door; said links being slidably mounted on the frame members, enclosed within the body wall and laterally removed from the doorway.

2. In a closed vehicle body having a doorway and a door mounted therein and hingedly connected thereto at one of its edges, means for providing a temporary opening in the roof when the door is opened, including: a hinged roof portion and means for moving said hinged roof portion by virtue of movement of the door, said last mentioned means comprising linkage members housed within the body wall and extending from the hinged edge of the door to and operatively connected to the hinged roof portion.

3. In a closed vehicle body having a doorway and a door mounted therein and hingedly connected thereto at one of its edges, means for providing a temporary opening in the roof when the door is opened, including: a hinged roof portion and a linkage system pivotally connected at one end to the hinged side of the door and extending in a plane with the body wall to and operatively connected to the hinged roof portion, said linkage system being housed and concealed within the body wall.

4. In a closed vehicle body having a doorway and a door therefor, one edge of which door is hingedly connected to the body for horizontal swinging movement, an opening in the roof communicating with the top of the doorway, a closure for said roof opening, and means for opening and closing said closure, including: a lever mounted on the body frame at a point within the body wall spaced from the doorway, an arm for moving the roof opening closure, linkage connected at one end to one arm of the lever and connected at its other end to said closure arm, and a link pivotally connected at one end to the hinged edge of the door and operatively connected with the other arm of the lever, said last mentioned link extending in a plane with the doorway.

RUST HEINZ.